United States Patent
Anand et al.

(10) Patent No.: US 7,953,946 B2
(45) Date of Patent: May 31, 2011

(54) CONTROLLED ANTICIPATION IN CREATING A SHADOW COPY

(75) Inventors: Karandeep Singh Anand, Kirkland, WA (US); Vijay Sen, Hyderabad (IN); Abid Ali, Hyderabad (IN); Manoj K. Valiyaparambil, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 486 days.

(21) Appl. No.: 11/735,670

(22) Filed: Apr. 16, 2007

(65) Prior Publication Data

US 2008/0256314 A1  Oct. 16, 2008

(51) Int. Cl.
G06F 13/00  (2006.01)

(52) U.S. Cl. .................. 711/162; 711/169; 717/168

(58) Field of Classification Search ............. 711/162, 711/169; 717/168
See application file for complete search history.

(56) References Cited

U.S. PATENT DOCUMENTS

| | | | |
|---|---|---|---|
| 4,459,658 A | 7/1984 | Gabbe et al. | |
| 5,664,186 A | 9/1997 | Bennett et al. | |
| 5,765,173 A * | 6/1998 | Cane et al. ............... | 707/204 |
| 6,078,999 A | 6/2000 | Raju et al. | |
| 6,360,364 B1 * | 3/2002 | Chen et al. ............... | 711/169 |
| 6,473,775 B1 | 10/2002 | Kusters et al. | |
| 7,174,436 B1 | 2/2007 | Langendorf et al. | |
| 2002/0092010 A1 * | 7/2002 | Fiske ...................... | 717/168 |
| 2004/0254936 A1 | 12/2004 | Mohamed | |
| 2005/0125411 A1 | 6/2005 | Kilian et al. | |
| 2005/0228832 A1 | 10/2005 | Ghotge et al. | |
| 2006/0020753 A1 | 1/2006 | Cochran et al. | |
| 2007/0162359 A1 | 7/2007 | Gokhale et al. | |
| 2008/0253746 A1 * | 10/2008 | Wood ........................ | 386/124 |

OTHER PUBLICATIONS

Author Unknown, Microsoft Volume Shadow-Copy Service and its Role in an Organization's Total Backup Strategy, NovaStor Open File Manager, http://www.novastor.com/graphics/VSS_White_Paper. pdf, printed Feb. 22, 2007, 22 pages, NovaStor Corporation, USA.
Sankaran, Ananda, et al, Volume Shadow Copy Service, Storage Environment, http://www.dell.com/downloads/global/power/1q04-san.pdf, Mar. 2004, 4 pages, Dell Corporation, US.
Euler, Laura et al, Simplify File Recovery with Data Protection Manager, Disaster Recovery, http://www.microsfot.com/technet/technetmag/issues/2006/08/DataProtectionManager/default.aspx, TechNet Magazine, Aug. 2006, 12 pages, Microsoft Corporation, USA.
Author Unknown, How Volume Shadow Copy Service Works, http://technet2.microsoft.com/WindowsServer/en/library/2b0d2457-b7d8-42c3-b6c9-59c145b7765f1033.mspx?mfr=true, updated Mar. 28, 2003, 9 pages, Microsoft Corporation, USA.

* cited by examiner

*Primary Examiner* — Yong Choe
(74) *Attorney, Agent, or Firm* — Senniger Powers LLP (57) ABSTRACT

Controlling data retention of a collection of data in a data store. An instruction is received to store a shadow collection of data to the data store. The data store has a previous version of the shadow collection of data. An available amount of data storage space on the data store is identified. An amount of data storage space needed is estimated for storing the shadow collection of data to the data store based on the received instruction. It is determined whether the identified available amount of data storage space is sufficient for storing the estimated amount of data storage space. The shadow collection of data is stored to the data store when said determine indicates that the identified available amount of data storage space is sufficient and the previous version is permitted to be deleted or to be overwritten.

17 Claims, 7 Drawing Sheets

```
SHADOW COPY TO BE CREATED:
  FILE LOCATION: C:\FILES...TEST.TXT

ESTIMATE OF NEEDED SPACE:
              16 BLOCKS

AVAILABLE SPACE:
              25 BLOCKS

SHADOW COPY CREATED
```

FIG. 6B

SHADOW COPY TO BE CREATED:

FILE LOCATION: C:\FILES...TEST.TXT

ESTIMATE OF NEEDED SPACE:

16 BLOCKS

AVAILABLE SPACE:

10 BLOCKS

SHADOW COPY NOT CREATED

US 7,953,946 B2

CONTROLLED ANTICIPATION IN CREATING A SHADOW COPY

BACKGROUND

Currently, there are two methods for creating shadow copies: making either a complete copy (a full copy or clone) or copying only the changes to the volume (a differential copy or copy-on-write). Each method results in two data images—the original volume and the shadow copy volume. In one example, the original volume maintains full read/write capabilities, whereas the shadow copy volume is read-only. This read-only status ensures that the shadow copy volume remains a point-in-time copy until its status is changed by the administrator for a specific purpose.

In performing a copy-on-write method, shadow copies are created and are differential rather than full copies of the original data. Like the clone method of creating shadow copies, the copy-on-write method can produce shadow copies using either software or hardware solutions. This method makes a copy of the original data before it is overwritten with new changes, as shown in the following table. When a change to the original volume occurs, but before it is written to disk, the block about to be modified is read and then written to a "differences area" (hereinafter "diff-area"), which preserves a copy of the data block before it is overwritten with the change. Using the blocks in the differences area and unchanged blocks in the original volume, a shadow copy can be logically constructed that represents the shadow copy at the point in time in which it was created.

While the copy-on-write method efficiently creates shadow copies on the shadow copy volume with a point-in-time information, such method deletes existing shadow copies if the diff-area provided is insufficient to store the changed blocks.

SUMMARY

Implementations of the present invention solve one or more problems in the art with systems, methods, and computer program products configured to ensure that shadow copies are preserved in a backup volume for as long as the shadow copies remain valid as per the administrator's backup goals/intents. In particular, embodiments of the invention control or manage the creation of a shadow copy by throttling the write operation before creating the shadow copy. Aspects of the invention ensure that the required shadow copies are maintained in order to meet the data retention intents provided by the administrator.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

APPENDIX A illustrates an implementation of controlling and anticipation of shadow copy retention according to an embodiment of the invention.

Corresponding reference characters indicate corresponding parts throughout the drawings.

DETAILED DESCRIPTION

The present invention extends to systems, methods, and computer program products configured to ensure that shadow copies are preserved in a backup volume for as long as the shadow copies remain valid as per the administrator's backup goals/intents. In particular, some implementations of the present invention provide for the automatic determination of shadow copy storage space on a backup volume based on determinations of write rates at the production server. Such a determination of available space can then be used in some cases to further determine whether the newer shadow copies can be created or not, in order to retain the existing shadow copies. In one implementation, the shadow copy storage space in the backup volume can be automatically reapportioned each replication cycle to accommodate anticipated write rates on the production server. Furthermore, the shadow copy storage space can be effectively locked so that shadow copies that exceed the present shadow copy storage space can be dealt with in an appropriate manner, and thus avoid overwriting prior, but still valid, shadow copies.

As will be appreciated more fully from the following description and claims, implementations of the present invention can prevent loss of valid shadow copy data. Generally, the "validity" of shadow copy, as used herein, relates to a backup intent for backup system 100, where a backup administrator's creates certain settings (i.e., the intent) for keeping incremental data updates available on a backup server for a specified time. In particular, a "valid" shadow copy is essentially a shadow copy that has not yet "expired," as defined by a particular "backup intent." For example, if a backup administrator set a backup intent that indicates that shadow copies are to be amassed x number of times a day, and then stored for at least 14 days before being deleted or perhaps moved to an archive media, the "valid" shadow copies are at least those that are not older than 14 days. By contrast, shadow copies at the backup server that are older than 14 days would be considered "invalid," or "expired," can be deleted or moved to an archive media, as desired by the backup administrator.

As such, implementations of the present invention are generally configured to prevent valid shadow copy data loss that might otherwise occur due to insufficient shadow copy storage space, and/or due to loss in shadow copy storage space (also referred to as the "diff-area") resulting from an increase in storage area for the main data being protected. For example, one or more components in one implementation can be configured to track growth of the data to be protected at a production server, and to further track the used and free space for a backup volume configured to hold shadow copy data. When, at any time, the components determine that valid shadow copy data in the backup volume are in danger of being overwritten, the components can halt replication processes at least momentarily (e.g., no new shadow copies are created). The components can then make automatic adjustments to the shadow copy storage space, or request direction of the same from a backup administrator before continuing.

As a preliminary matter, implementations of the present invention are described primarily herein where the storage area for the main data to be protected and the storage area for the shadow copy data are on separate volumes. Such an architectural schematic, however, is not required. In particular, implementations of the present invention can also be applied to the situation in which the same backup volume contains allocated storage areas for main data and for the corresponding updates (i.e., shadow copy data).

Figure 1:
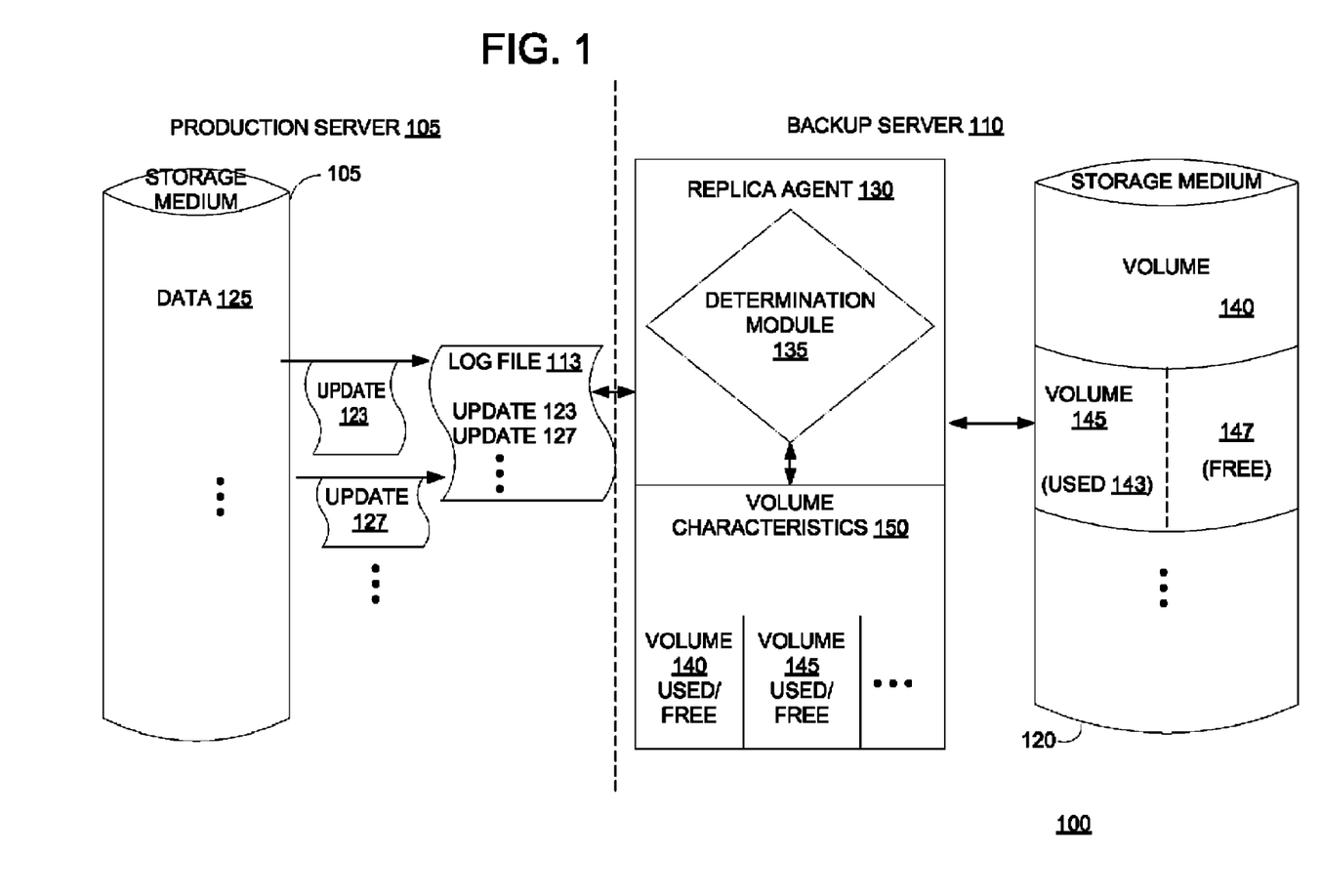
FIG. 1 illustrates an overview schematic diagram of a production server and backup server in a backup system, wherein a replica agent receives updates from a production server and applies the updates to a backup volume, in accordance with an implementation of the present invention.

For example, FIG. 1 illustrates an architectural overview of backup system 100, which includes a production server 105 (e.g., a mail, file, or database server, etc.) that communicates with a backup server 110 (e.g., a data protection manager—"DPM"—server). As shown, production server 105 includes at least storage medium 115, which further includes one or more volumes of data to be protected, such as data 125. A log file 113 at production server 105 can identify all changes to data 125. Accordingly, log file 113 includes updates 123 and 127, which production server 105 will ultimately pass to backup server 110.

FIG. 1 also illustrates that backup server 110 comprises replica agent 130. Generally, replica agent 130 comprises one or more sets of computer-executable instructions configured to communicate with production server 105, and to track various characteristics of one or more attached backup storage mediums, such as storage medium 120. For example, FIG. 1 shows that replica agent 130 can include a volume characteristics 150 component, which stores various used and free space characteristics for each volume in storage medium 120 (and/or any other connected backup medium).

By way of explanation, replica agent 130 and/or determination module 135 need not necessarily be a component resident on backup server 110. In particular, replica agent 130 and/or determination module 135 can be implemented on production server 105 and/or on any other server (not shown) in backup system 100. The present illustration(s) herein of replica agent 130 and determination module 135 on backup server 110, therefore, are primarily for purposes of convenience in illustrating at least one implementation.

In any event, determination module 135 can identify the size of updates made to protected data (e.g., 125) at production server 105. In one implementation, determination module 135 determines the actual byte size of all changes in data 125 over the course of a replication cycle (e.g., every 15 minutes) during a general archive period (e.g., 14 days—the time to keep shadow copies before archiving or deleting them). Such a granular determination may not necessarily be required in all cases, however. For example, it may be more efficient in some cases to identify a more conservative estimate of how much space may be needed to copy over data updates into a diff area (e.g., 143). In one implementation, this can be done by identifying byte changes in terms of file (or byte) blocks.

In general, a file block (or byte block) is typically a set of bytes in a "file." For purposes of this specification and claims, a "file" will be understood in its broadest sense to include any type of discrete data collection, such as discrete data collections associated with electronic mail, database programs, system libraries or components, etc., rather than (or in addition to) ordinary user application files. In any event, the set of bytes in a file block typically has a fixed size of typically from about 4096 bytes to about 16384 bytes. Thus, a file could be described as a set of 3 byte blocks in addition to being described as some arbitrary number of bytes. As will be understood more fully from the following specification and claims, therefore, replica agent 130 (via determination module 135) can determine the number of blocks that need to be written from production server 105 (i.e., size of changes), the number available blocks in storage medium 120 (i.e., size of allocated storage), or some combination thereof.

For example, replica agent 130 (via determination module 135) can determine the total size of changes to data 125 by tracking changes during a replication process but before synchronizing this data with (i.e., applying these changes to) the corresponding backup volume. This can be done in one instance by determining all created, modified, and/or deleted files from a file system log/journal (e.g., an update sequence number journal, block change bitmap, or log file) 113. Replica agent 130 can then ascribe a certain standard value (i.e., block value) with regard to whether metadata in a file has changed, whether the file is new, whether the file has been appended, whether one or more bytes in a given file block have changed, and/or whether the file has been deleted. As previously mentioned, this block value can then provide a conservative overestimate of how much will ultimately need to be written at storage medium 120.

For example, replica agent 130 can be configured to tally a certain number of blocks for each metadata change, and count this separately from block values assigned to other types of file changes. In one implementation, replica agent 130 counts 1 block each time it identifies a change in the file metadata related to time of file modification, security properties, file name, or some other file attribute. If each of these and other metadata properties have changed, replica agent 130 may need to count several separate blocks. The replica agent 130 can, however, be optimized to simply identify 1 block for metadata changes that could cancel each other out, such as identifying several changes to the same metadata field (e.g., several file name changes).

Replica agent 130 can also be configured to count all of the new blocks that are added to a file. For example, if log file 113 identifies a newly created file having 3 blocks, replica agent 130 can add 3 blocks to the tally. Alternatively, for appended files, replica agent 130 might only add one block value for each block that has been added to the given file. Similarly, replica agent 130 can be configured to add a single block for one or more byte changes within the same file block, or add multiple blocks when several bytes across several different blocks in the same file have been changed. Replica agent 130 can then add together each of these individual tallies (i.e., number of metadata changes, number of file changes, creations, or appends) to gain an estimate for how much space will be required at storage medium 120.

In some cases, this tally can also be modified by consideration of the total number of deleted blocks. In general, some volume shadow copy services are configured to copy a prior version of a block from a backup volume (e.g., 140) to a shadow copy volume (e.g., 143) when identifying that the production server has deleted that block at its storage medium (e.g., 115). In some cases, the volume shadow copy service may be configured only to report a deletion in a block when the given deleted block has been overwritten by another file or file block. In other cases, the volume shadow copy service may be configured to report both generic byte/block deletions as well as byte/block overwrites. Accordingly, replica agent 130 can be configured to accommodate whatever shadow copy services that are employed to ensure that the most accurate total is reflected of blocks that will need to be passed to the corresponding backup volume.

For example, replica agent 130 can be configured to identify from a file system journal, log file or block change bitmap (e.g., 113) only the total number of deleted blocks that are being overwritten, as well as the size of those deleted files. In one implementation, the size of those deleted blocks may be based on a cumulative value across multiple replication cycles (and changes due to error correction). Along these lines, replica agent 130 can also be configured to assume that all newly added blocks will necessarily overwrite deleted blocks where available. In this example, therefore, replica agent 130 may determine that the total size of changes for data 125 can be approximated by the total of the number blocks due to metadata changes, the number of newly added blocks, and the number of deleted blocks that were overwritten by newly added blocks.

Upon (or before) identifying the size of changes at production server 105, replica agent 130 can also determine the size of available area at the backup storage medium (e.g., 120) to identify whether to apply the identified changes. For example, replica agent 130 can identify the amount of free space in the storage area allocated for shadow copies in main backup volume 140 by querying a volume shadow copy service (not shown). Alternatively, where the main data backup and shadow copy backups are stored on separate volumes (e.g., 140, 125), replica agent 130 identifies how much free space (e.g., 147) is found in the volume used to storage shadow copies. In either case, replica agent 130 determines whether the changes at production server 105 can be applied to storage medium 120 without overwriting existing, valid shadow copies.

In particular, if replica agent 130 identifies that the total size of file/data changes (e.g., 123, 127) from production server 105 does not exceed the available free space (e.g., 147) available for shadow copies, then replica agent 130 can simply apply these changes to storage medium 120 as appropriate. On the other hand, if the size of changes (e.g., 123, 127) on the data to be protected exceeds the calculated space available for shadow copies, replica agent 130 can at least momentarily halt applying changes to storage medium 120. Replica agent 130 can also raise an alert through an appropriate interface, to indicate to a backup administrator (or appropriate system component) indicating that replication has halted, and that the storage area allocated for shadow copies is completely full.

In other cases, replica agent 130 can indicate that the storage area allocated for shadow copies is not full, but nevertheless insufficient in size to accommodate current changes. Alternatively, replica agent 130 can be configured to determine a rate of change identified from production server 105, and thus raise an error indicating that the available space allocated for shadow copies if likely to be insufficient in size. Replica agent 130 can also prompt the backup administrator to increase the available space for writing shadow copies (e.g., by increasing an allocated portion within main data backup volume 140, or by increasing the total size of volume 145). Replica agent 130 can further recommend that the backup administrator simply delete existing shadow copies on a "first in first out" order until there is sufficient size. For example, in one implementation, replica agent 130 recommends how many shadow copies to delete, and reports to the backup administrator a last recovery point that will be available after performing any such deletions.

When appropriate, replica agent 130 can then restart or resume the replication cycle in accordance with the original schedule, and apply changes indicated by production server 105. As the replication cycle continues, replica agent 130 can continue to estimate the available free space in the shadow copy storage space. For example, when replica agent 130 sets up protection initially, replica agent 130 identifies the used and free space, and stores this information in a volume characteristics component 150. In such a case, replica agent 130 might set the used space (e.g., 143) in the shadow copy storage space (e.g., 145) to 0, and store the upper end value of the shadow copy storage space/volume (or of the allocated portion in the main data backup volume 140) 145 previously set by the backup administrator. During replication, or any other operation that modifies the used space in the volume (e.g., validation and error correction), replica agent 130 can continually add the number of blocks to the used space amount, which conversely subtracts these amounts from the previously identified free space.

Thus, replica agent 130 can continually estimate how much space may be left in the backup volume with what has been written. Nevertheless, replica agent 130 may need to further adjust this total further before applying the remainder of changes. As appropriate (whether before or during a replication cycle), replica agent 130 can also delete expired shadow copies from the used space (e.g., 143) and subtract the size of each deleted shadow copy from the used space (e.g., 143), as appropriate. Replica agent 130 can also consider any modifications to the upper end of the allocated shadow copy storage space (or storage volume—e.g., 145). For example, replica agent 130 can receive additional input from a backup administrator regarding an increase or decrease in the total size allocated for shadow copies. Thus, when appropriate, replica agent 130 can continue to pass any remaining files or file blocks to the available shadow copy storage space.

One will appreciate that, due to the starting and stopping of replication, there may be instances of inconsistency between the main data backup (e.g., 140) and any shadow copy backups (e.g., 145) compared to what is being written at production server 105 into log file 113. Accordingly, replica agent 130 can also be configured to perform (or recommend) synchronization with a consistency check (i.e., validation and error correction) to accommodate any overflow in log file 113. Such synchronization is discussed more fully hereinafter.

Continuing with reference to FIG. 1, rather than necessarily calculating the total size of changes and applying those changes when appropriate, replica agent 130 can be configured to make ongoing queries and determinations of what space is available, and then apply portions of the received updates to the shadow copy storage area. In contrast with the foregoing description, this can place the bulk of work into identifying the size of free available space at storage medium 120 for writing shadow copies, rather than on identifying the size of all changes being received from production server 105. Generally, there are a number of mechanisms in accordance with implementations of the present invention in which this can be done.

In one implementation, for example, when receiving file changes from production server 105 during a replication cycle, replica agent 130 can simply query the available free shadow copy storage space (e.g., 145) on a per-file or per-block basis, and then, if appropriate, write each next file (or block(s)) to the available shadow copy storage space. If there is insufficient space for the next set of one or more files (or block(s)), then replica agent 130 can raise an alert. Querying the available free space for each file or file block being passed to the backup volume, however, may be difficult for some backup systems from a resource usage standpoint. Accordingly, replica agent 130 can be configured to use a less granular calculation that nevertheless provides a fairly conservative estimate of what may be available.

For example, replica agent 130 can be configured to calculate a "safe" available area of free space for storing shadow copies, and then query this available area on a much less frequent basis (e.g., every 10,000 files or file blocks) than on a per file or per block basis as described above. As previously mentioned, attempting to set aside a safe underestimated amount can be helpful for preserving valid shadow copies. In addition, another reason such underestimating can be helpful is that some volume shadow copy services may only apply data updates of deleted blocks to the shadow copy storage area when new blocks get written on top of those deleted blocks. Thus, setting a safe underestimated limit can help maintain existing shadow copies where a prior estimation of the available space would otherwise turn out to be insufficient—that is, more data than expected (i.e., overwritten blocks) would being sent to the shadow copy storage space.

In any event, replica agent 130 can determine the safe shadow copy storage space any number of ways. In one implementation, for example, replica agent 130 can identify at the outset a presently available amount of free space available for storing shadow copies, and then set a predetermined percentage of the free space as a "safe." In one implementation, for example, replica agent 130 identifies 90% of the free space as safe. Thus, with an initial set of files or file blocks (e.g., the first 10,000 files or file blocks of 100,000 files or blocks), and knowing a rough approximation of the value of the safe free space (i.e., 90% of an initial determination of free space), replica agent 130 can write each of the files or file blocks of the initial set into the available safe storage space.

After writing the first set of files or file blocks, replica agent 130 can then determine (such as by querying an appropriate volume shadow copy service) the remaining available free space, and again set off "90%" of the free space as safe. If the next set of files or file blocks fit within this space, then replica agent 130 can simply write these blocks into the free space, as before. If, however, replica agent 130 determines that the new value for the free space is less than appropriate for the next set of files or file blocks, replica agent 130 can then perform a number of additional steps.

For example, in one implementation, replica agent 130 simply writes only those files or file blocks of the next set that can fit into the safe available free space. In some cases, replica agent 130 may be configured to write only files, rather than blocks of files, and thereby keep the main data storage (e.g., volume 140) consistent with the shadow copy storage (e.g., volume 145). For example, if two blocks of a file have changed at production server 105, replica agent 130 can be configured to write both of the file blocks to storage medium 120, or neither of the blocks in this file if only one of the blocks will fit.

If replica agent 130 subsequently determines that no single file (i.e., changed or added blocks in the file) can be written to the safe available shadow copy storage space, replica agent 130 can then set the safe available size to an appropriate value (e.g., "0"), which raises an alert. This can cause replica agent 130 to raise an alert indicating that a given write operation could not be completed successfully, and that there are x amount of files or file blocks that still need to be accommodated. Replica agent 130 can then recommend that the backup administrator increase the total allocated storage area for shadow copies (e.g., size of volume 145, or size of an allocation within volume 140) or delete existing shadow copies before trying again to apply changes. Assuming such adjustments can be—and are—made, replica agent 130 can repeat this process of writing sets of files and/or file blocks into the safe available shadow copy storage space, as described.

Along these lines, replica agent 130 can also use a volume filter driver (not shown) to monitor all backup volumes (e.g., 140, 145, etc. of storage medium 120) at backup server 110. This can be helpful to ensure that no other processes other than replica agent 130 can write to the backup volume (i.e., shadow copy storage space 145) or at least make sure that even if other processes/applications are writing to the backup volume, the same checks are made to ensure that the valid shadow copies are retained, which can provide various security benefits. In one implementation, for example, the volume filter driver can store a variable that is initialized with the amount of available shadow copy storage space (e.g., 147). Each time replica agent 130 writes data to the main data backup volume (e.g., 140), the volume filter driver can assume that this write will result in deleted data being moved to the corresponding shadow copy volume (e.g., 145). In such a case, the volume filter may be configured to assume the extreme scenario wherein each write is a change to existing data, and requires not just the new write but also a copy of the overwritten data to be passed to the shadow copy storage space.

As such, the volume filter driver can be configured to decrement 1 block from the free available shadow copy storage space for each identified write to the main data backup. The volume filter driver can also routinely synchronize its determinations of available free shadow copy storage space (as described more fully hereinafter). Ultimately, when the available shadow copy data space allotment is decremented to 0, replica agent 130 (which receives its data in this case from the volume filter driver) will be unable to make any writes to storage medium 120, and thus no writes to the shadow copy storage space (e.g., 145). In turn, replica agent 130 can raise an alert to the backup administrator, requesting any one or more of the various accommodating actions previously described.

In light of the various size approximations described herein, a backup administrator may need to resolve incidences in which block sizes differ in the production server 105 file system compared with the same blocks in the backup storage medium 120. In particular, a block change computed prior to a replication cycle or validation/error correction may not necessarily translate to the same size of block change on the available shadow copy space. Of course, if the file system block at production server 105 size is larger than or equal to the block size administered at storage medium 120, there may not be any issues since the available free space at storage medium 120 will be effectively underestimated. On the other hand, if the block size at production server 105 is less than the block size at storage medium 120, then the available free space at storage medium 120 will be effectively overestimated, which could result in premature shadow copy overwrites/deletions. In such a case replica agent 130 can perform a number of additional steps to underestimate the amount of available free space.

For example, replica agent 130 can set the production server 105 block size and backup storage medium 120 block size to be the same. This can involve the replica agent 130 normalizing the size of changes determined earlier, so that a block match between production server 105 and storage medium 120 is effectively one-to-one. Alternatively, replica agent 130 can adjust the determination of total blocks due to changes at production server 105, and add one or more blocks, and thereby overestimate the number of changes received from production server 105. In this regard, replica agent 130 can be configured to assume that changed blocks are contiguous, and, as such, add one block to the computed changed blocks at production server 105 that need to be written to storage medium 120.

Alternatively, replica agent 130 can be configured to walk through the logical offsets of each of the changed blocks at production server 105. In such a case, replica agent might add 1 block value to each set of contiguous blocks that have changed (or are new), and also count 1 standalone block that has changed as 2 blocks. In still another alternative implementation, the replica agent 130 could walk through the logical offsets of the changed file blocks at production server 105, and compare these boundaries with block boundaries used at storage medium 120, such as used by a volume shadow copy service. The backup server 110 can use this comparison to determine the precise number of changed blocks (as they are defined at storage medium 120) from production server 105 that will need to be applied to the shadow copy storage space (e.g., 145).

Also in light of the various approximations described herein, replica agent 130 may further need to periodically synchronize its approximations of the available shadow copy storage space with the actual available shadow copy storage space. This can help prevent the compounding approximation errors over time. In one implementation, for example, replica agent 130 can determine the available free shadow copy storage space (e.g., 147) upon identifying that there is sufficient space to apply a particular change at production server 105, but before applying such a change. Replica agent 130 might then label this as "pre space." Upon applying changes from production server 105, replica agent 130 can then query (i.e., querying a volume shadow copy service) the remaining, available shadow copy storage space e.g., 147 after changes), and label this as "post space."

Assuming no shadow copies have been reclaimed in between, the "actual changes" applied to the shadow copy storage are represented by the difference between the "pre space" and the "post space." Replica agent 130 can then compute the deleted blocks by subtracting the modified blocks (as opposed to new blocks) from the "actual changes," based on the assumption that modified blocks comprise deleted blocks that have been overwritten, as previously described. This can result in a value of "adjusted deleted blocks." Replica agent 130 can then use the "adjusted deleted blocks" in the previously described processes when computing the size of changes.

Figure 2:
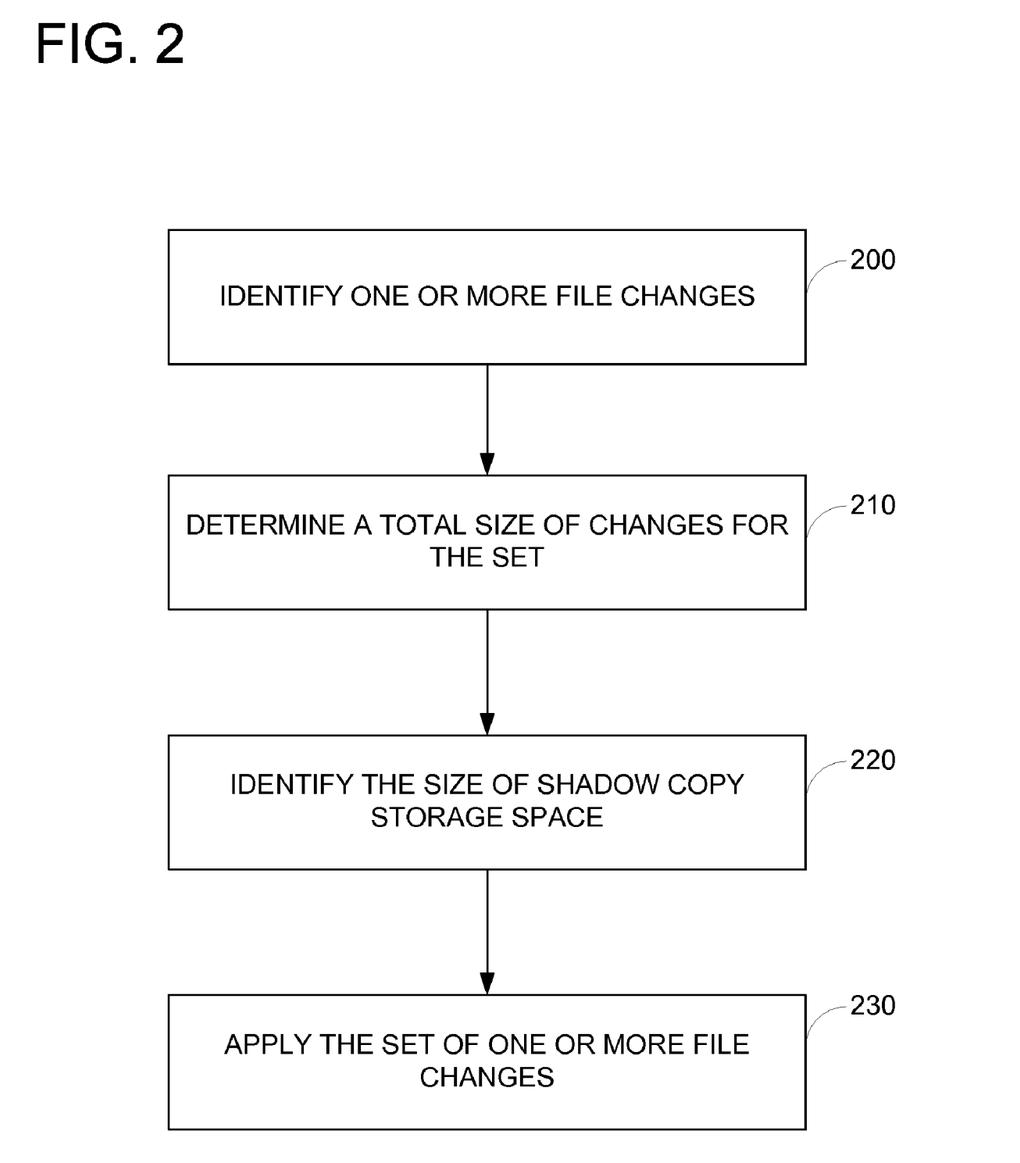
FIG. 2 illustrates a flowchart of a sequence of acts in a method of applying changes from a production server to a backup server by identifying the total size of changes coming from the production server.
Figure 3:
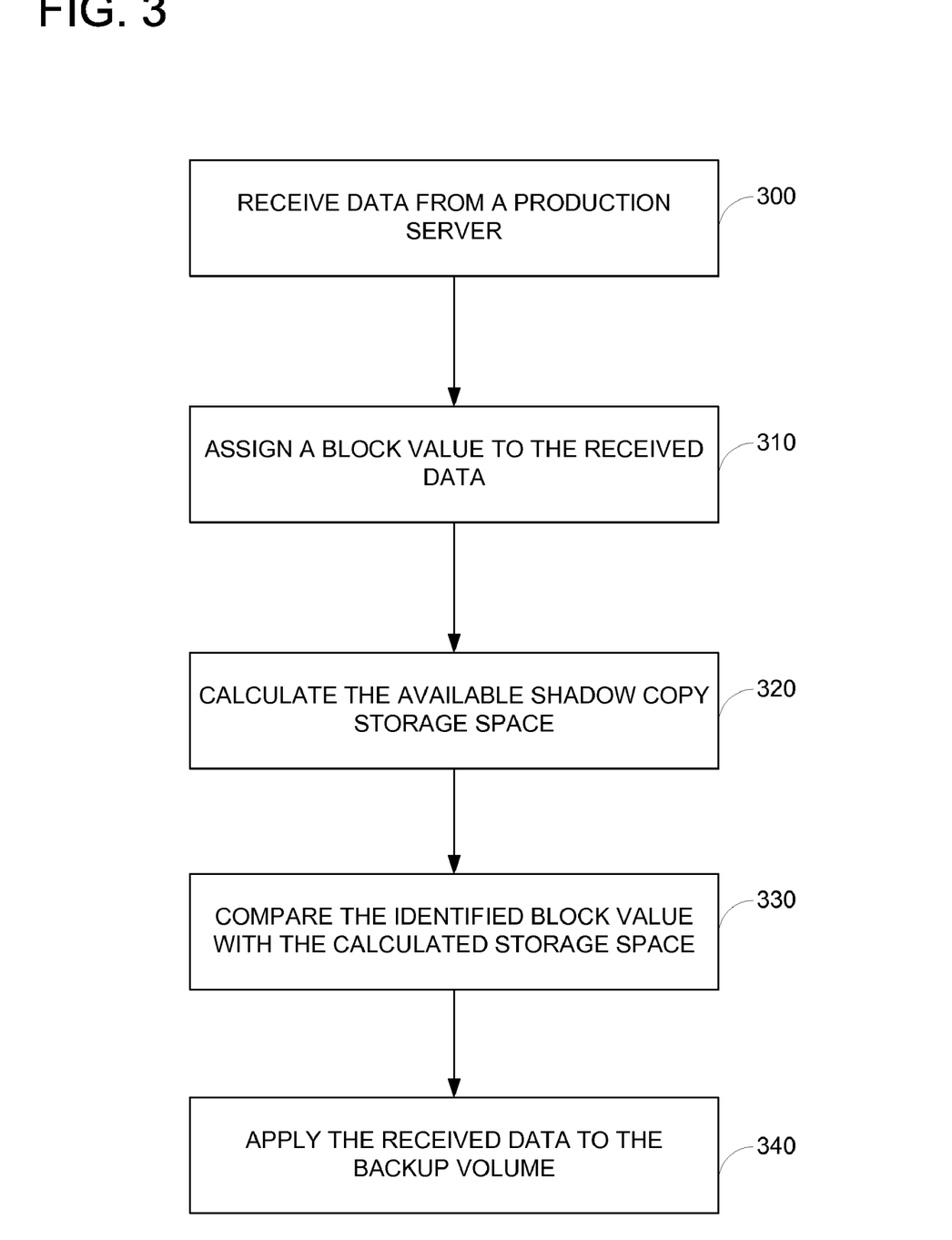
FIG. 3 illustrates a flowchart of a sequence of acts in a method of applying changes from a production server to a backup server by identifying the total size of available free space before applying changes received from the production server.

Accordingly, the foregoing text describes a number of components and modules that can ensure that valid copies of backup updates (i.e., shadow copies) can survive their intended time. In particular, such implementations can be applied to make current backup systems much more robust, reliable, and efficient, without unduly burdening technical personnel, such as backup administrators. Implementations of the present invention can also be described in terms of flowcharts of methods comprising a series of one or more acts or steps for accomplishing intended results. For example, FIG. 2 illustrates a flowchart of a method of identifying the total size of changes at a production server that are to be applied at a backup server, while FIG. 3 illustrates a flowchart of a method for identifying available storage space in the backup server prior to applying changes. FIGS. 2 and 3 are discussed below with reference to the components illustrated in FIG. 1.

In particular, FIG. 2 shows that a method in accordance with an implementation of the present invention of correlating determinations of file changes at a production server with available shadow copy storage space in one or more backup volumes identifies one or more file changes at 200. For example, the production server identifies a set of one or more data changes at a production server. Also, replica agent 130 may receive data updates 123 and/or 127 from production server 105, via log file 113.

In addition, a total size of changes for the set is determined at 210. For example, the replica agent 130 may determine a total size of changes in the set that are to be applied to a shadow copy storage volume, such that the total size of changes is overestimated. Also, upon receiving changes via log file 113, replica agent 130 may determine a value that approximates the size of changes that will ultimately need to be applied to backup volume 145.

In an alternative embodiment, the replica agent 130 may assign a standard value to each data portion in each new file of the set, assign the standard value to each data portion that is appended to any file in the set, and assign the standard value to each file that has been overwritten. For example, replica agent 130 assigns one byte block value (or other data size equivalent) when identifying blocks that are new (e.g., new files, file appends), blocks that have been modified, or when identifying files (or blocks) that have been overwritten. In a further embodiment, the replica agent 130 may assign the standard value to each metadata portion that has been changed in any file of the set, and add each assigned standard value, such that the total size of changes at the production server is approximated. For example, replica agent 130 may add a block for each metadata change (or one block for changes that cancel out), and then add all block assignments to approximate the total size of blocks that will need to be applied to the backup volume (e.g., 145).

At 220, the size of shadow copy storage space is identified. For example, replica agent 130 queries a volume shadow copy service to identify how much space is both allocated and free in a generalized backup volume (e.g., 140), or how much space is free (e.g., 147) in a shadow copy storage volume (e.g., 145). At 230, the replica agent 130 applies the set of one or more data changes to the identified available shadow copy storage space such that valid shadow copies remain in the shadow copy storage volume prior to expiration. For example, upon identifying the total size of changes from production server 105, and upon identifying how much space is free in the appropriate backup volume, replica agent 130 can pass the received changes to the backup volume.

In one embodiment, the replica agent 130 identifies an amount of free space in the available shadow copy space, and compares the total size of changes to the identified free space. In another alternative embodiment, the replica agent 130 identifies the amount of free space is at least as large as the total size of changes, and automatically applying the set of one or more data changes to the identified free space. For example, if replica agent 130 identifies that the available free space (e.g., 147) is at least as large as the total size of changes received from production server 105, replica agent 130 (e.g., via a volume shadow copy service) can simply pass those received changes to the shadow copy storage space. Of course, and as previously described herein, if the available shadow copy storage space is insufficient in size, replica agent 130 can either delete expired shadow copies, or raise an alert to the backup administrator for further action.

FIG. 3 illustrates a similar method as in FIG. 2, however; FIG. 3 is geared more toward simply receiving updates and expending resources determining how much space is available in the shadow copy storage area. In particular, FIG. 3 shows that a method of determining available shadow copy storage space in the one or more backup volumes to thereby apply data updates received from a production server without deleting valid shadow copy data can comprise an act 300 of receiving data from a production server. At 300, one or more data changes from a production server are received. For example, replica agent 130 receives a set of one or more data changes from production server 105 (regarding data 125) via log file 113.

At 310, replica agent 130 assigns a block value to the received data, including assigning a standard value to each of the one or more data changes in an initial set. For example, and as previously described herein, replica agent 130 can be configured to pass a single file, or a single block, at a time into the corresponding shadow copy storage space (e.g., 145) as it continually determines how much free space is available. At the outset, therefore, replica agent might take an initial file in a set of one or more data updates, and determine how many block values to assign to the file (e.g., one block for an append, one block for a changed/modified pre-existing block, etc.).

The replica agent 130 calculates the available shadow copy storage space at 320, such as calculating an amount of available shadow copy storage space in a backup volume, such that the amount is underestimated in order to preserve valid shadow copies stored in the backup volume. For example, replica agent 130 can routinely query a volume shadow copy service each time replica agent 130 begins to pass a "file" (as understood herein) to the shadow copy storage space for how much space is free. Although replica agent 130 will generally pass data directly to the main data backup and use a volume shadow copy service (not shown) to pass shadow copy data to the shadow copy storage space, replica agent 130 may query the volume shadow copy service for available free space. Replica agent 130 may also simply query the volume shadow copy service for the available free space every several sets of files received from production server 105, and then consider a certain portion of the free space as safe.

In another embodiment, replica agent 130 may identify a first byte block of the one or more data changes, request from a volume shadow copy service an amount of the available shadow copy storage space that is free, identify a second byte block of the one or more data changes, and request again from the volume shadow copy service an amount of the available shadow copy storage space that is free. Alternatively, replica agent 130 may identify an amount of the available shadow copy storage space that is free, set a reduced portion of the identified free space as safe, and sum the standard values corresponding to a first plurality of data changes in the set to determine a total size of changes for the first plurality.

At 330, replica agent 130 compares the identified block value with the calculated storage space. In an alternative embodiment, replica agent 130 identifies that the standard value of the initial set of the one or more data changes is less than the calculated amount of the available shadow copy storage space in the backup volume. For example, replica agent 130 determines that the total size of changes for the initial file or sets of files (e.g., a subset of all changes received from production server 105) is less than either an instant query result for available free space, or less than what it previously deemed as fitting in a safe amount of the shadow copy storage space.

At 340, replica agent 130 applies the received data to the backup volume. In one embodiment, replica agent 130 applies the initial set of the one or more data changes to the backup volume, such that valid shadow copies remain in the shadow copy storage volume prior to expiration. For example, if appropriately fitting within the identified free space or safe amount of free space, replica agent 130 can simply pass the initial file (or sets of files) received from production server to the free space in the backup volume (e.g., 147). Alternatively, if doing so will cause deletion of preexisting but valid shadow copies from the backup volume, replica agent 130 can raise an alert, or take other automatic actions to accommodate for this, as previously described.

Figure 4:
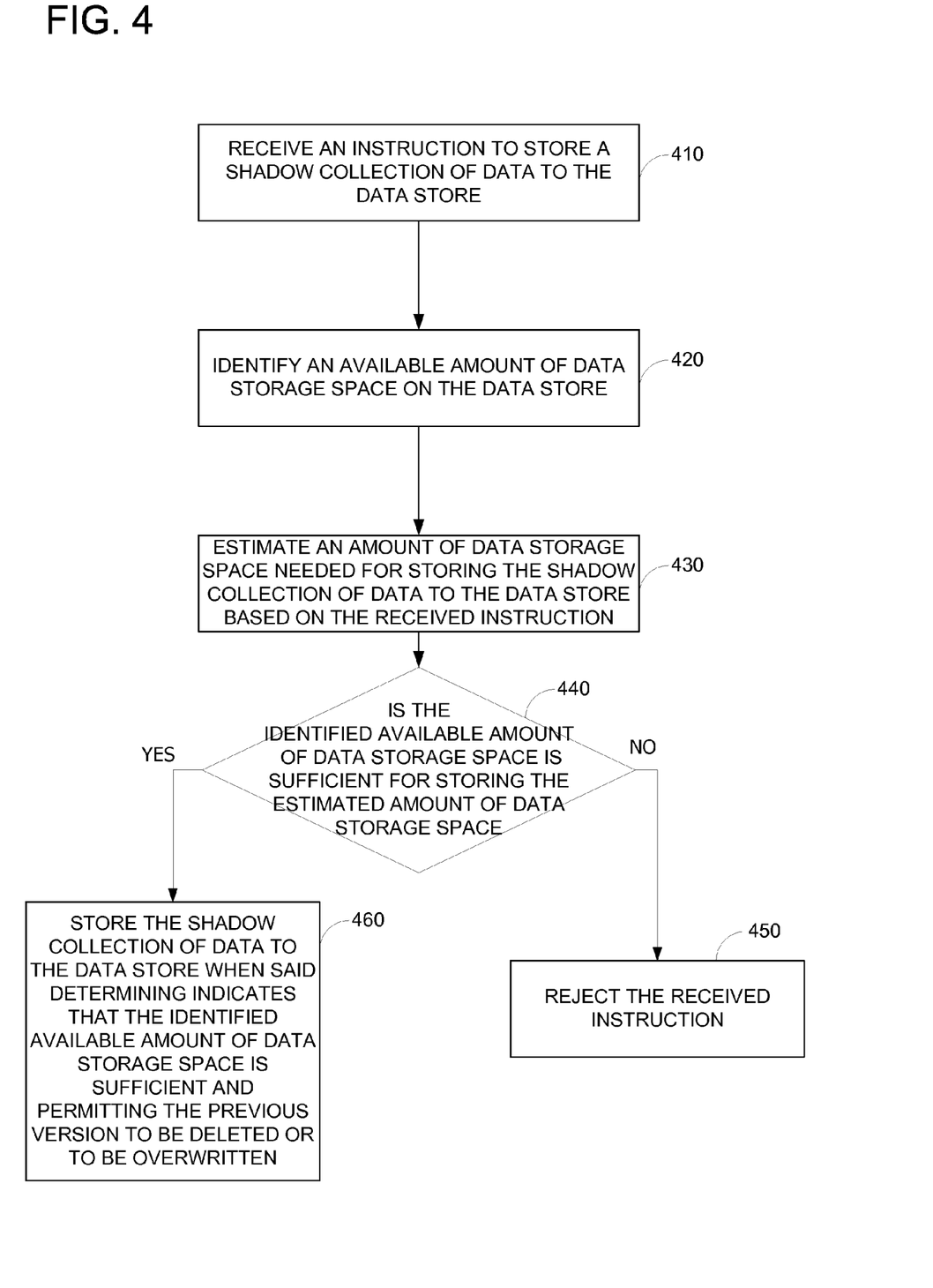
FIG. 4 is an exemplary flow chart illustrating operation of estimating the amount of shadow copy of data to be written before writing the shadow copy to a backup server or a backup volume according to an embodiment of the invention.

In yet a further embodiment of the invention, FIG. 4 illustrates operations for estimating the amount of shadow copy of data to be written before writing the shadow copy to a backup server or a backup volume according to an embodiment of the invention. For example, while the preexisting but valid shadow copies may be kept, expired or invalid shadow copies may be moved or deleted while an attempt to write new shadow copies are made, as described above. As such, embodiments shown in FIG. 4 estimates the amount of storage or blocks needed for the shadow copy to be written on the diff-area or the backup volume. In this example, at 410, an instruction to store a shadow collection of data (e.g., shadow copy) to the data store (e.g., diff-area or shadow copy volume) is received via a user interface. The shadow collection of data is a later version of a previous version the shadow collection of data, such as a previous shadow copy. At 420, an available amount of data storage space is identified on the data store. For example, the replica agent 130 identifies the total amount of data storage available on the data store or the backup volume. An amount of data storage space needed for storing the shadow collection of data is estimated based on the received instruction at 430.

In one example, embodiments of the invention evaluate a total size of volsnap block changes prior to write or store the shadow collection of data. In another example, the writing or storing operation involves one or more operations including a compression of the shadow collection of data before the shadow collection of data is written or stored on the data store or the backup storage volume. In another alternative embodiment, the one or more operations include other operations such as encryption operation, transactions or operations provided by file-system, or the like may be performed in addition to, in conjunction to, or separate from the compression of the shadow collection of data. As such, in the example of the compression operation, the estimated amount of data storage is performed prior to a completion of a compression, which in one example corresponds to creating a file or files for the shadow collection of data. In yet another embodiment, the compression operation creates files represented by block changes as the shadow collection of data and completes the compression once the shadow collection of data (as the files) is created. In an alternative embodiment, the available amount of data storage space includes a buffer storage space, which is created for a worst-case scenario when the estimated amount is not as accurate as anticipated.

At 440, it is determined whether the identified available amount of data storage space is sufficient for storing the estimated amount of data storage space. For example, if the estimated amount of storage space is more than the identified available amount, the operation to write the new shadow copy (e.g., by the replica agent 130) will terminate or abort at 450, and the received instruction is rejected. In addition, the previous version of the collection of data is not deleted and/or is not overwritten so that a shadow version of the collection of data is preserved. On the other hand, if the estimated amount of storage space is less than the identified available amount, at 460, the shadow collection of data is stored or written on the backup volume and the previous version of the collection of data is either deleted or is overwritten by the later version or overwritten by other data. As such, the write-operation or storing-operation of new shadow copies is throttled or controlled so that no existing shadow copies are deleted when a new shadow copy is requested.

Figure 5:
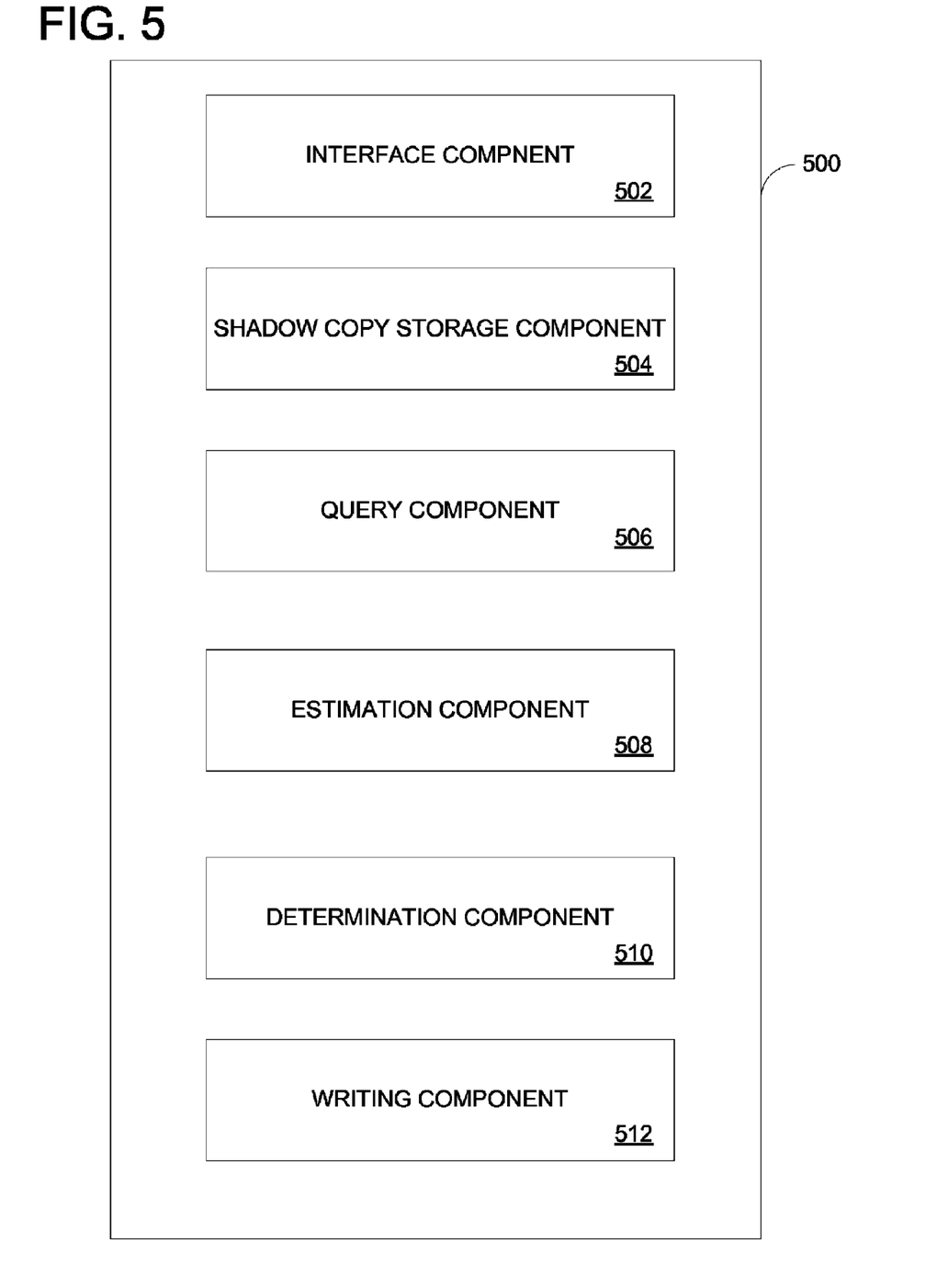
FIG. 5 is a block diagram illustrating an exemplary computer-readable medium on which aspects of the invention may be stored.

FIG. 5 illustrates an exemplary computer-readable medium 500 on which aspects of the invention may be stored. In one embodiment, the computer-readable medium 500 includes computer-executable instructions for performing some or all operations described in FIG. 4. For example, the computer-readable medium 500 includes an interface component 502 for receiving an instruction for storing a shadow collection of data to the data store. As described above, the shadow collection of data may be a later version of a previous version the collection of data, such as a previous shadow copy. A query component 506 identifies an available amount of data storage space on the data store. An estimation component 508 estimates an amount of data storage space needed for storing the shadow collection of data to the data store based on the received instruction. A determination component 510 determined whether the identified available amount of data storage space is sufficient for storing the estimated amount of data storage space. If the identified available amount of data storage space is greater than the estimated amount, a writing component 512 writes or stores the shadow collection of data on a shadow copy storage component 504. In addition, the previous version of the shadow collection of data is not deleted and/or is not overwritten so that a previous version of the shadow collection of data is preserved. On the other hand, the determination component 510 determines that the estimated amount of storage space is less than the identified available amount, the shadow collection of data is stored or written on the backup volume and the previous version of the shadow collection of data is either deleted or is overwritten by the later version or overwritten by other data. In another example, Appendix A describes an implementation of controlling and anticipation of shadow copy retention according to an embodiment of the invention.

Figure 6A:
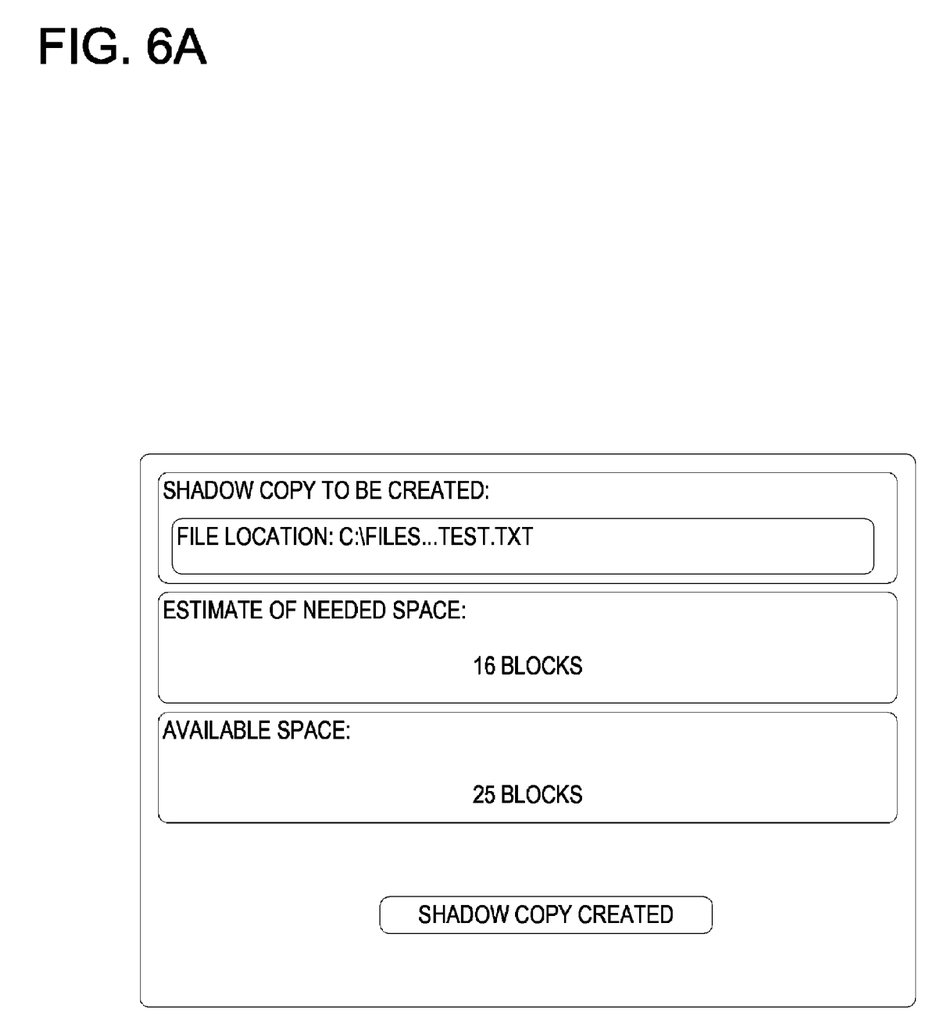
FIGS. 6A to 6B illustrate exemplary screen shots in response to controlled write operation of a shadow copy of data to a shadow volume according to an embodiment of the invention.
Figure 6B:
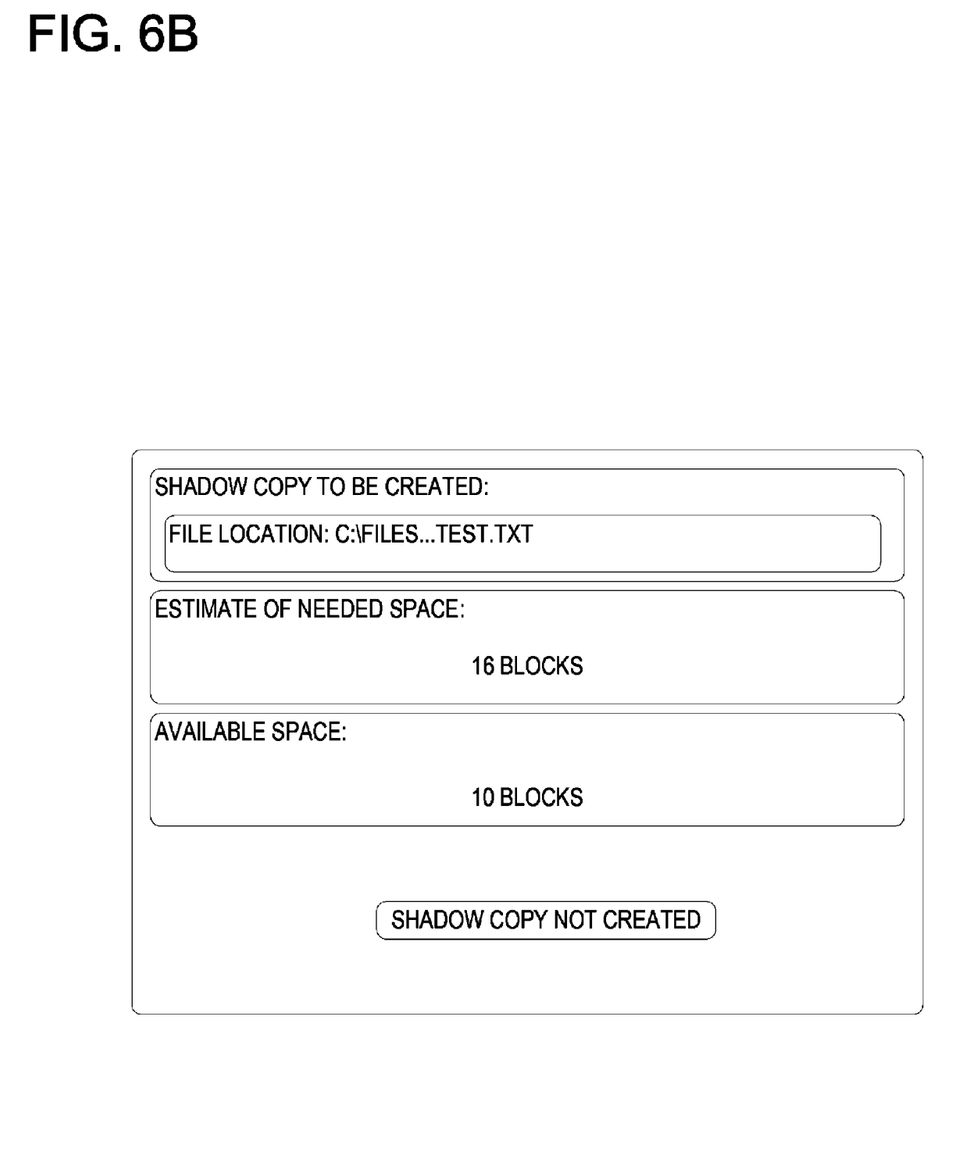

In yet another embodiment of the invention, FIGS. 6A and 6B illustrate an exemplary screenshots indicative of an outcome after executing or performing operations described above. For example, FIG. 6A is an exemplary screenshot showing that the write-operation or storing-operation is completed after it is determined that the available amount of data storage is greater than the estimated amount (i.e., the received instruction is accepted). On the other hand, FIG. 6B illustrates that the write-operation or storing-operation is not initiated or attempted after it is determined that the available amount is less than the estimated amount of data to be written.

Accordingly, implementations of the present invention provide a number of components, schematics, and methods for ensuring that shadow copies can be retained throughout their valid period without danger of the shadow copies being deleted prematurely. In particular, implementations of the present invention provide a variety of mechanisms that allow these issues to be treated from a variety of alternative perspectives (i.e., total size of changes, continual monitoring of shadow copy storage space, and useful estimations of shadow copy storage space). Furthermore, implementations of the present invention provide a number of mechanisms for ensuring the consistency of data size measurements between two servers, and for mitigating approximation errors that could multiple over time through various synchronization processes. As such, implementations of the present invention provide much more efficient and reliable shadow copy backup mechanisms than conventionally available.

The embodiments of the present invention may comprise a special purpose or general-purpose computer including various computer hardware, as discussed in greater detail below. In particular, embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

In operation, a computer or computing device executes computer-executable instructions such as those illustrated in the figures, such as FIGS. 2 to 4, to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

Examples below illustrate an implementation of controlling and anticipation of shadow copy retention according to an embodiment of the invention:

We will use the following heuristics to estimate number of blocks changed at volume level. For example, a block size for volsnap is 16K:

- Creation of file: Ceil [File Size/Block Size]+2. Two additional blocks are for (i) metadata changes (ii) the alignment of write may not be at block boundary
- Deletion/move of file: 1. (This is for metadata change.)
- Update in data stream (normal stream data as well as alternate): Ceil [Size of update/Block Size]+1.1 block is for metadata changes
- Unset of compression flag: Equivalent to creation of file
- Set of compression flag: 1.5 times equivalent to creation of file. We multiply by 1.5 to cover for expansion of file during compression. This can be improved if there is a way to check the size of compressed file on disk.
- Encryption: Since we rewrite the file, it's equivalent to creation of file
- Metadata changes like setting attributes, timestamp, objected, set sparse file: 1
- SIS file: Link creation and common store file creation will get covered in 'creation of file'. For SIS link break when write happen to one link of SIS file, volume filter will track writes to complete file and hence it's covered in update. If file system filter is used, logic of detecting SIS link break is needed and an equivalent of file size to diff-area churn may be added. To find out if applicator is breaking SIS link compare the reparse tag on replica with that on the production server.
- TxFS is equivalent to normal file system because only completed transaction on file-system is applied. We will have to consider rollback when applicator on replica also uses transaction to apply changes that occurred in a transaction.

Since it is not possible to correctly estimate the churn, we will implement following logic to throttle or control:

```
CalculateAllowedChurn ( ) {
FreeDiffArea = FreeSpaceOnDiffAreaVolume;
FreeDiffAreaExcludingBuffer = FreeDiffArea – Buffer; // Buffer
would be around 300 MB. This is the space that will be used if we
under-estimate the churn
AllowedChurn = MIN (FreeDiffAreaExcludingBuffer,
WriteChunk); // WriteChunk would be around 500MB. Recheck after
500MB to correct errors in estimate
}
ApplyChanges ( ) {
If ((AllowedChurn – EstimateOfCurrentChurn) > 0) {
    WriteOnReplica;
    AllowedChurn = AllowedChurn – EstimateOfCurrentChurn;
} else {
    AllowedChurn = CalculateAllowedChurn; // Refresh data on space
    If ((AllowedChurn – EstimationOfCurrentChurn) > 0) {
        // either we hit WriteChunk limit or we over-estimated the
        churn so far.
        ApplyChanges( );
    }
    Else {
        Fail the task; // we cannot write on replica because diff-area
        is nearing end
    }
}
```

What is claimed is:

1. A method for controlling data retention of a collection of data in a data store, said method comprising:
   receiving an instruction to store a shadow collection of data to the data store, said shadow collection of data comprising changes to an original volume, said data store having a previous version of the shadow collection of data so that the shadow collection is related to the previous shadow collection;
   identifying an available amount of data storage space on the data store, said identifying comprising querying the identified available amount of data storage space on a per-block basis and based on the response to the querying, calculating an underestimated, specific amount as a safe available area on the data store;
   estimating an amount of data storage space needed for storing the shadow collection of data to the data store based on the received instruction;
   determining whether the identified available amount of data storage space is sufficient for storing the estimated amount of data storage space; and
   in response to the determining that the identified available amount of data storage space is insufficient for storing the estimated amount of data storage space for the shadow collection, storing only files and not partial blocks of files of the portion of the shadow collection if not all blocks of the files can be fitted in the identified available amount of data storage space,
   wherein the previous version of the shadow collection of data is deemed valid and forbidden from deletion by a user, and wherein storing comprises rejecting the received instruction when the available amount of data storage space is less than the estimated amount of data storage space so that the valid version of the shadow collection of data is not deleted, overwritten or removed.

2. The method of claim 1, further comprising providing a notification indicating a failure to store the shadow collection of data on the data store in response to rejecting the received instruction.

3. The method of claim 1, wherein identifying comprises querying the data store to determine the available amount of data storage space on the data store.

4. The method of claim 1, wherein the data store comprises a shadow copy storage volume.

5. The method of claim 4, wherein estimating comprises evaluating volsnap block changes at a volume level.

6. The method of claim 5, wherein evaluating comprises evaluating a total size of volsnap block changes prior to a completion of one or more operations, said one or more operations including a compression, said compression creating files represented by block changes as the shadow collection of data to the data store.

7. The method of claim 1, wherein one or more non-transitory computer storage media have computer-executable instructions for performing the method of claim 1.

8. A system for preventing overwriting shadow copy data on a backup volume, said system comprising:
- an interface for receiving an instruction for storing a new shadow copy of data, said new shadow copy of date comprising changes to an original volume;
- the backup volume for writing the new shadow copy of data over a previous version of the shadow copy of data stored on the backup volume;
- a processor configured for executing computer-executable instructions for:
  - in response to the received instruction, identifying an available amount of data storage space on the backup volume;
  - estimating an amount of data storage space needed for writing the new shadow copy of data on the backup volume based on the received instruction;
  - determining whether the identified available amount of data storage space is sufficient for writing the estimated amount of data storage; and
  - if it is determined that sufficient data storage space is available, writing the new shadow copy of data on the backup volume by overwriting the previous version; and
  - if it is determined that data storage space is insufficient, the processor stores only files and not partial blocks of files of the portion of the new shadow copy of data if not all blocks of the files can be fitted in the identified available amount of data storage space,
- wherein the previous version of the shadow copy data is forbidden from deletion by a user, and wherein the processor is further configured to prevent overwriting of the previous version of the shadow copy data by rejecting the received instruction when the available amount of data storage space is less than the estimated amount of data storage space so that the previous version of the shadow copy data is not overwritten.

9. The system of claim 8, wherein the interface is further configured to provide a notification indicative of the rejected instruction.

10. The system of claim 8, wherein the processor is configured to query the backup volume to determine the available amount of data storage space on the backup volume.

11. The system of claim 8, wherein the backup volume includes a buffer storage space, said buffer storage space being excluded from the available amount of data storage space on the backup volume.

12. The system of claim 8, wherein the processor is configure to estimate by evaluating a total size of volsnap block changes prior to a completion of one or more operations, said one or more operations including a compression, said compression creating files represented by block changes as the shadow copy data to the backup volume.

13. One or more non-transitory computer storage media having computer-executable components for controlling writing shadow copy data on a backup volume, said computer-executable components comprising:
- an interface component for receiving an instruction for writing a new shadow copy of data;
- a shadow copy storage component for writing the new shadow copy of data on the backup volume, said new shadow copy of data comprising changes to an original volume, said backup volume having a previous version of the shadow copy of data;
- a query component, in response to the received instruction, for identifying an available amount of data storage space on the backup volume;
- an estimation component for estimating an amount of data storage space needed for writing the new shadow copy of data on the backup volume based on the received instruction;
- a determination component for determining whether the identified available amount of data storage space is sufficient for storing the estimated amount of data storage; and
- if the determination component determines that sufficient data storage space is available, a writing component for writing the new shadow copy of data on the backup volume without deleting or overwriting the previous version; and
- if the determination component determines that data storage space is insufficient, the writing component stores only files and not partial blocks of files of the portion of the new shadow copy of data if not all blocks of the files can be fitted in the identified available amount of data storage space,
- wherein the previous version of the shadow copy data is deemed valid and forbidden from deletion by a user, and wherein the writing component is further configured to prevent overwriting of the existing shadow copy data by rejecting the received instruction when the available amount of data storage space is less than the estimated amount of data storage space so that the previous version of the shadow copy data is not deleted or does not get deleted, overwritten or removed.

14. The non-transitory computer storage media of claim 13, wherein the interface component is further configured to provide a notification indicative of the rejected instruction.

15. The non-transitory computer storage media of claim 13, wherein the query component is configured to query the backup volume to determine the available amount of data storage space on the backup volume.

16. The non-transitory computer storage media of claim 13, wherein the backup volume includes a buffer storage space, said buffer storage space being excluded from the available amount of data storage space on the backup volume.

17. The non-transitory computer storage media of claim 13, wherein the estimation component is configured to evaluate a total size of volsnap block changes prior to a completion of one or more operations, said one or more operations including a compression, said compression creating files represented by block changes as the shadow copy data to the data store.

* * * * *